United States Patent [19]

Prince

[11] 3,953,670
[45] Apr. 27, 1976

[54] ADAPTIVE VIDEO CENTROID TRACKER
[75] Inventor: Paul R. Prince, Manhattan Beach, Calif.
[73] Assignee: Hughes Aircraft Company, Culver City, Calif.
[22] Filed: Dec. 28, 1970
[21] Appl. No.: 102,247

[52] U.S. Cl............................ 178/6.8; 178/DIG. 21; 250/203 CT
[51] Int. Cl.² ........................ H04N 7/00; G01J 1/20
[58] Field of Search...................... 178/6.8, DIG. 21; 250/203 CT; 244/3.17

[56] References Cited
UNITED STATES PATENTS

| 3,566,026 | 2/1971 | Bonebreak.................... 178/DIG. 21 |
| 3,586,770 | 6/1971 | Bonebreak...................... 178/6.8 |

Primary Examiner—Richard A. Farley
Assistant Examiner—S. C. Buczinski
Attorney, Agent, or Firm—W. H. MacAllister; Lawrence V. Link, Jr.

[57] ABSTRACT

A video tracking system including a processor unit for adaptive gating and processing video output signals from a television camera to form computing signals therefrom. The time duration of the computing signals is representative of the duration of corresponding increments of area of a selected target image, and their amplitude is an inverse function of the total image area. The computing signals are further processed within a pair of error detector channels, each having a plurality of integrators interconnected by gating circuits controlled by fixed time duration computing gates, to form output signals representative of the relative angular position of the centroid of the image.

14 Claims, 9 Drawing Figures

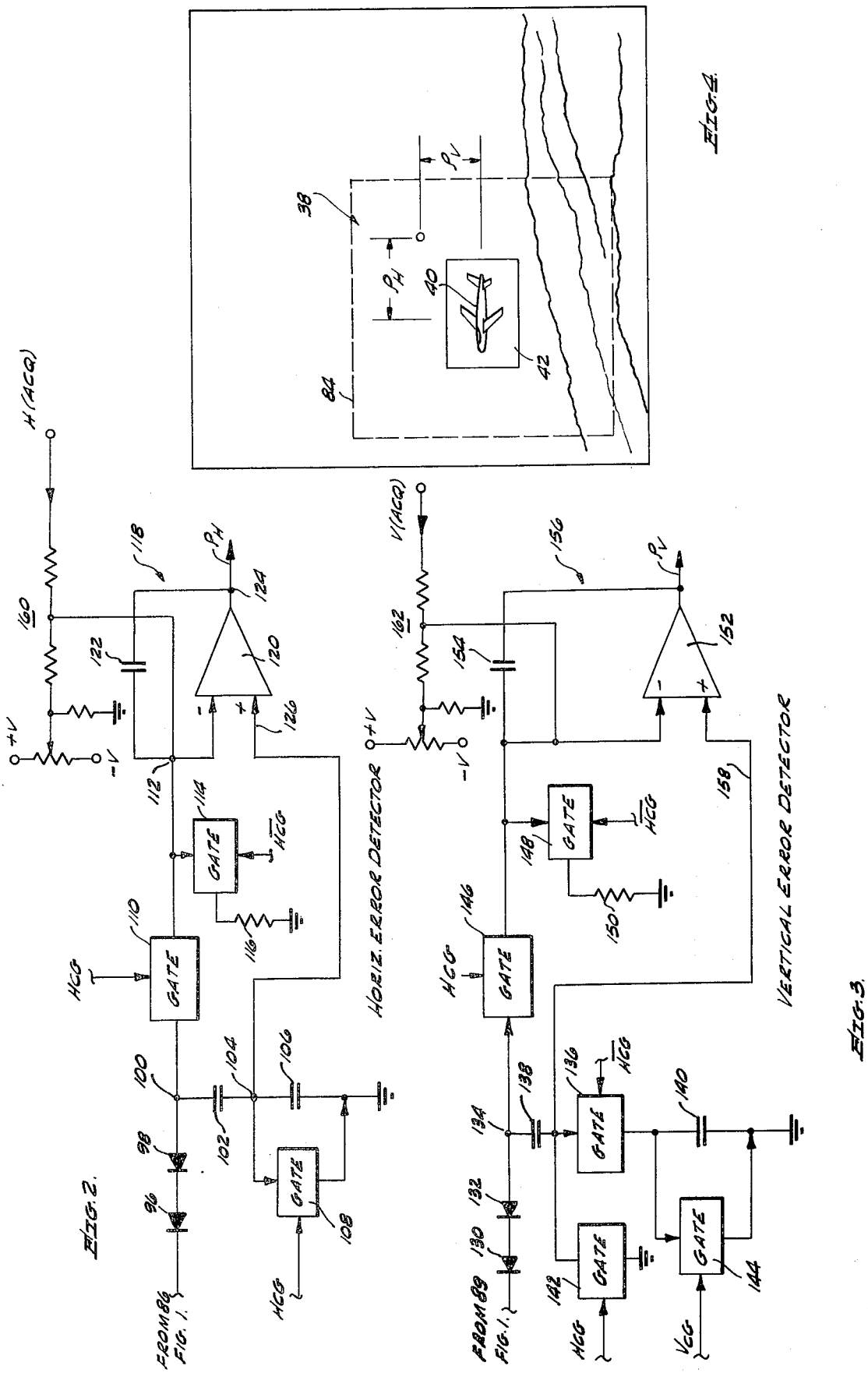

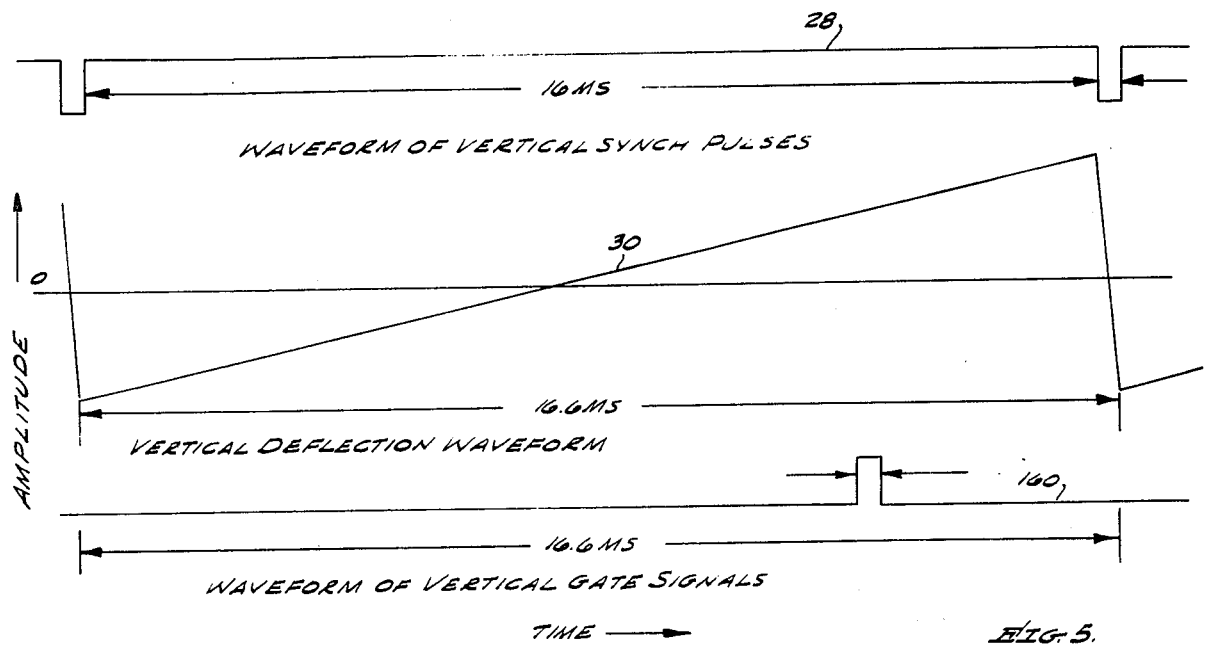
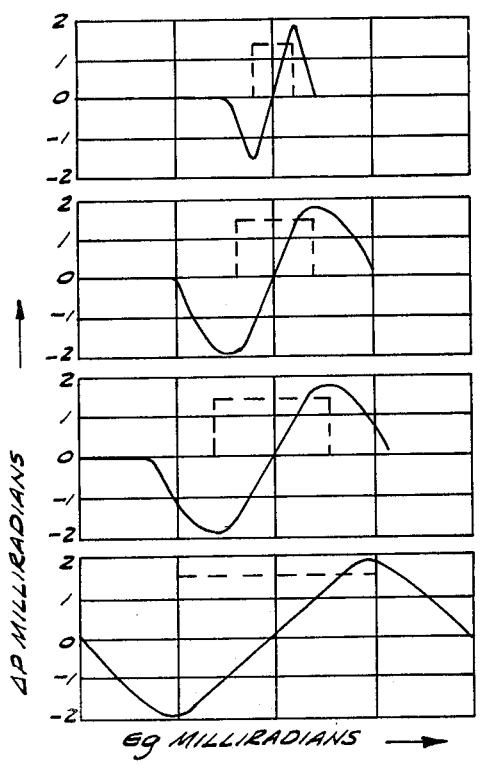
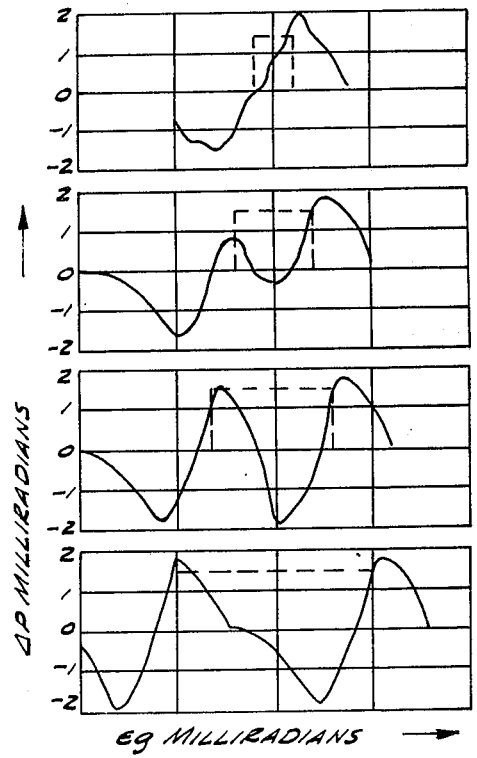

ADAPTIVE VIDEO CENTROID TRACKER

BACKGROUND OF THE INVENTION

This invention relates generally to tracking systems and more particularly to adaptive gated centroid tracking systems.

Each of the various prior art video tracking systems, although performing satisfactorily for some applications, have limitations when applied to the total range of applicable uses. For example, prior centroid trackers, while possessing excellent performance characteristics in the presence of noise and in the acquisition of the targets, have restricted usefulness in applications where the target image size exceeds that of the fixed size video tracking gates. Attempts to incorporate adaptive gating into these centroid trackers have encountered serious difficulties, such as an unacceptable increase in complexity, inherent with the computation technique and mechanization of the prior systems. On the other hand, "gradient" and "area balance" type systems incorporating "blooming" target image tracking features have reduced performance capabilities in the presence of noise and/or in the acquisition of targets. An important aspect of the subject invention is the recognition of the complementary limitations of these two types of prior art systems and the development of a mechanization which is practical to implement, reliable in operation and which provides the advantages of both prior art techniques.

SUMMARY OF THE INVENTION

It is therefore an object of the subject invention to provide a video tracking system having improved accuracy and stability.

It is a further object to provide an improved centroid type tracking system with increased capabilities for tracking blooming target images.

Another object of the invention is to provide a video tracking system incorporating a new and improved centroid computation technique, whereby improved performance is provided for both low signal conditions and blooming target conditions.

Briefly, the subject invention includes a video tracker for measuring the relative angular position of a target. Signals from a transducer, such as a television camera, are processed so as to provide adaptive gated normalized target video signals. The normalized target video signals are further processed to provide a current $I_1$ which is a function of the reciprocal of the target area. The time duration of tracking gates used in the processing section are controlled so that the gates are adaptive to the target image size. The current $I_1$ is gated by the normalized target video signals to form a computing signal $[S(t)]$ applied to a computation section of the tracker.

The computation section determines the relative angular position of the centroid of the target image in each of two dimensions, and includes separate but similar error detector channels. These error detector channels continually update the last computed position information. For centroid tracking, the single and double integral of the computing signals are required; and in accordance with the subject invention these integral terms are generated by energy storage and gating circuits coupled to the input of a final integrator in each processor channel. The energy storage circuits respond to the computing signals, and the gating circuits are controlled by fixed time duration computing gates. The output signal from the final integrator in each error detector channel is a voltage representative of the position of the centroid of the target image in the corresponding tracking dimension. In accordance with the subject invention, the duration of the integration time of the error detector channels is not determined by the adaptive gates of the processor section, but rather by the fixed time duration of the relative large computing gates. It is the compensating effects of the computing signal amplitude decreasing as a function of increasing target image size, and the large fixed size computing gates which allows stabilized centroid tracking with adaptive gated target image signals.

BRIEF DESCRIPTION OF THE DRAWINGS

The novel features of this invention, as well as the invention itself, will be better understood from the accompanying description taken in connection with the accompanying drawings in which like reference characters refer to like parts and in which:

FIGS. 2 and 3 are block and schematic diagrams of the horizontal error detector unit and the vertical error detector unit, respectively, of FIG. 1;

FIG. 4 is a display of the screen of the TV monitor of FIG. 1 and is useful for explaining the operation of the centroid tracking system in accordance with the invention;

FIGS. 5 and 6 are diagrams of voltage amplitudes versus time waveforms useful for explaining the operation of the system in accordance with the invention;

FIGS. 7 and 8 are diagrams showing error characteristics of a gradient type system and of a centroid type tracking system, respectively, useful for explaining the advantages of the system in accordance with the subject invention.

DESCRIPTION OF THE PREFERRED EMBODIMENT

Figure 1:
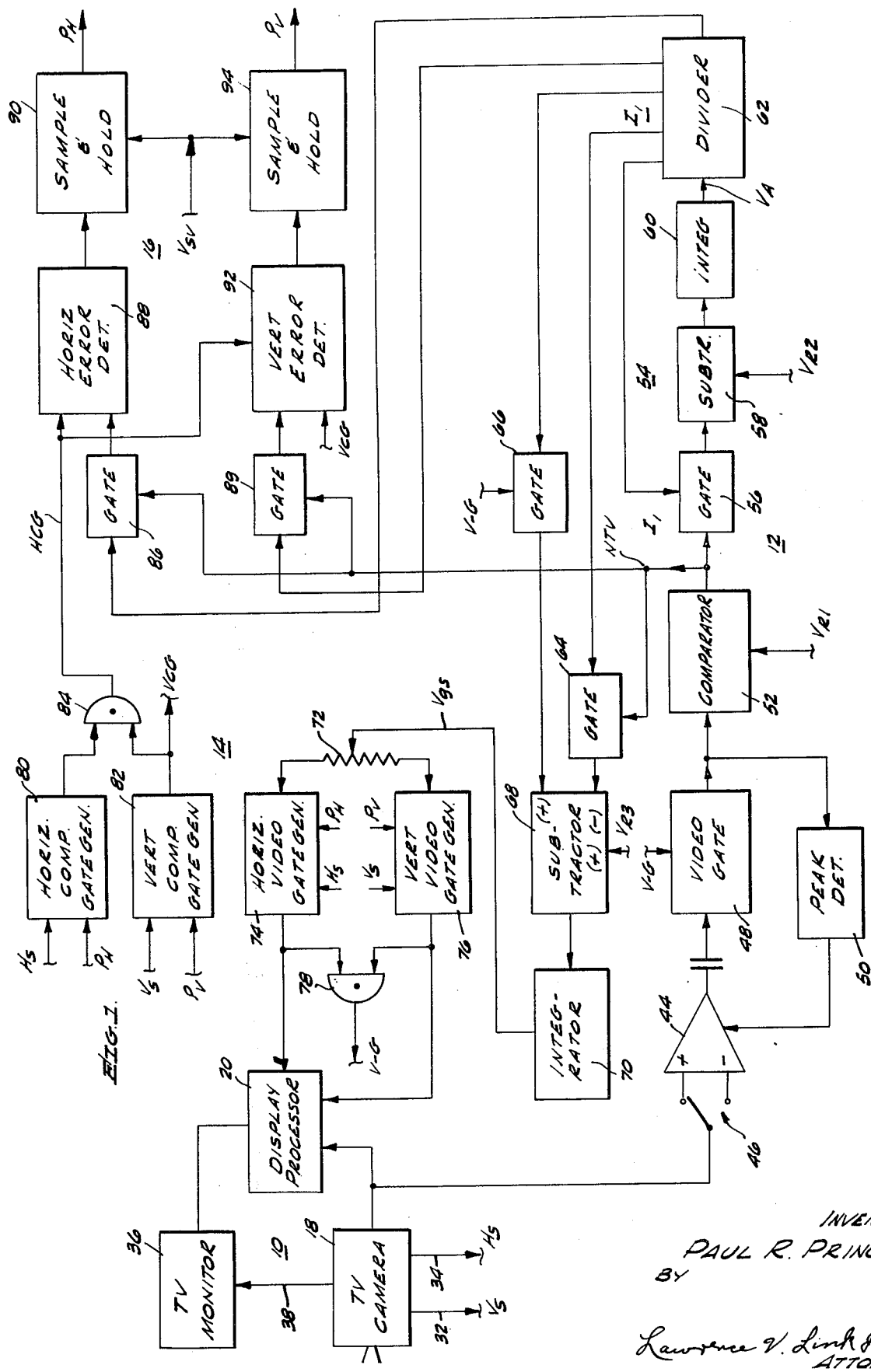
FIG. 1 is a block and schematic diagram of one preferred embodiment of a centroid tracking system in accordance with the subject invention.

The embodiment of the invention shown in FIG. 1 includes a sensor display section 10, a signal processing section 12, a gate generating section 14 and a computing section 16.

Figure 6:
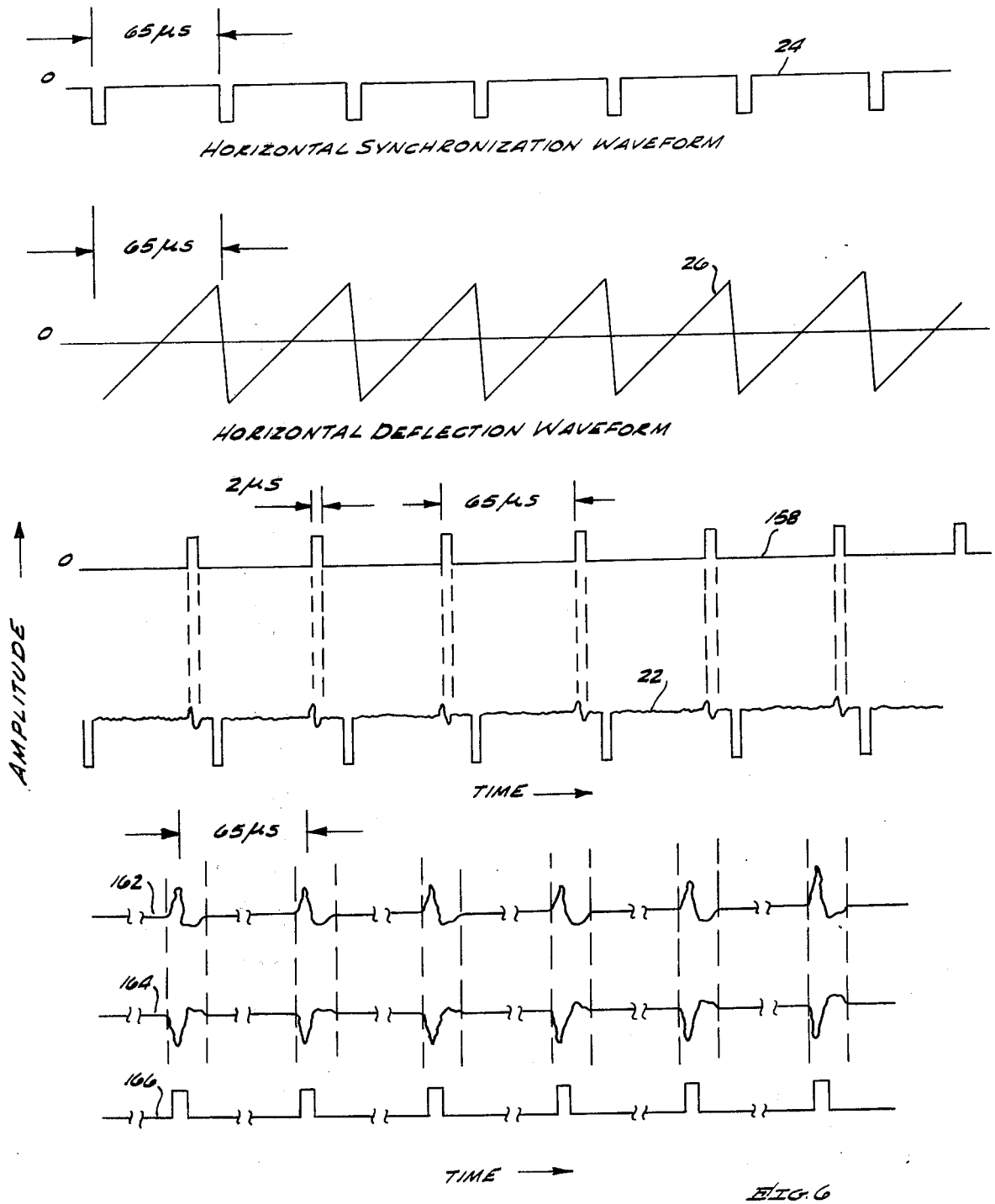

Sensor and display section 10 includes a transducer 18 which may be a television camera, for example. The camera 18 applies video signals in a conventional line-by-line format to a display processor 20 and to tracking processor 12. A waveform 22 of FIG. 6 shows a rudimentary example of several lines of the video output signals from the camera 18; and waveforms 24 and 26 illustrate horizontal synchronization and deflection signals, respectively, associated therewith. Waveforms 28 and 30 of FIG. 5 depict typical vertical synchronization and deflection waveforms associated with camera 18. The vertical and horizontal synchronization signals are applied to the gating section 14 on leads 32 and 34, respectively; and to a TV monitor 36 on a composite lead 38.

Horizontal and vertical processing gates are applied to display processor unit 20 from the gate generator section 14, and are combined therein with the video signal from the television camera 18 so as to form the composite video and gate display for TV monitor 36. A typical display associated with monitor 36 is shown in FIG. 4. As there shown, a target image 40 is bracketed by adaptive processing gates 42. The angular position of the centroid of the target image from the tracking axis of the TV camera 18 is represented by the position voltages $\rho_h$ and $\rho_v$, in the horizontal and vertical dimensions, respectively.

The video signals from camera 18 are also applied to an input amplifier 44 of the processing section 12 through a target contrast selection switch 46. The plurality of the output signal of the amplifier 44 (inverted or not) is determined by the position of switch 46. The output signal from amplifier 44 is AC coupled to a video gate circuit 48 which is controlled by a variable size processing gate (V–G) applied from gate generator section 14. The output signal from gate circuit 48 is applied in parallel to a peak detector 50 and to a comparator circuit 52. The output signal from video gate 48 is at a zero level except during the video gate time, when video is present, and it is referenced to the mean level of the gated video. The peak positive excursion, which represents the target, is measured in peak detector 50 and the output signal therefrom is used to adjust the video gain of amplifier 44 so as to maintain an approximately constant peak target "swing" at the input circuit of comparator 52.

Comparator 52 distinguishes signals as representative of the target or not based on a fixed threshold level $V_{R1}$ and the output of the comparator (normalized target video) is a digital signal in amplitude but analog in time duration. The normalized target video is representative of the target image and when integrated in a feedback loop 54 provides a signal $V_A$ representative of the target image area.

Feedback loop 54 includes a gating circuit 56, a subtractor 58, an integrator 60 and a divider 62. The divider is a wide dynamic-range electronic analog device whose output current $I_1$ is representative of a constant divided by the input signal to the divider. The loop 54 forces the voltage $V_A$ applied to the input of divider 62, to be representative of target image area. Hence, the current $I_1$ is a function of the reciprocal of the image area. All of the output leads from divider 62 carry the current $I_1$, and a plurality of separate leads are shown due to the fact that the subsequent processing requires accurate current sources with little interaction between the various processing circuits. The current $I_1$ is gated in gate 56 by the normalized target video signals and the output signal therefrom is subtracted from the reference calibration voltage $V_{R2}$, whereby the integral of the output signal from subtractor 58 is the area voltage $V_A$.

The current $I_1$ is also gated by the normalized target video signals (NTV) in a gate 64 and by the variable size processing gate (V–G) in a gate 66. The output signal of gate 66 is combined with a reference calibration voltage $V_{R3}$ and subtracted from the output signal of gate 64 in a subtraction device 68. The output signal from unit 68 is integrated in an integrator 70 so as to provide a control signal $V_{gs}$ which is approximately proportional to the square root of the target image area. The voltage $V_{gs}$ is applied to an aspect ratio potentiometer 72, and the two output leads from potentiometer 72 control the size of the horizontal and vertical variable size processing gates provided by horizontal gate generator and vertical gate generator 74 and 76, respectively. These horizontal and vertical gate generators are synchronized by the horizontal and vertical synchronization pulses, respectively; and they provide output gating pulses, the relative time position of which are controlled by the voltages $\rho_h$ and $\rho_v$, respectively. The time duration of the variable size processing gates (V–G) in controlled by the currents applied from the aspect ratio potentiometers 72. The horizontal and vertical processing gates produced by gate generator 74 and 76 are applied to display processor 20 and to an AND gate 78. The output signal of gate 78 is the variable size processing gate (V–G) which controls the gating circuits 48 and 66 in the signal processing section 12, as described hereinabove.

Horizontal and vertical computing gate generators 80 and 82 provide gating signals of a fixed time duration and are positioned in time relative to the horizontal and vertical synchronization signals respectively, by the voltages $\rho_h$ and $\rho_v$ respectively. The output signals of the gates 80 and 82 are combined in an AND gate 84, the output of which is designated, horizontal computing gate (HCG). The relative size of the HCG gate relative to the variable gate of the processor section 12 is depicted in FIG. 4, with the HCG gate being indicated by dashed lines 84. The dashed lines 84 were included in the display of FIG. 4 to demonstrate the relative size between the variable processing gates and the horizontal and the computing gates. However, it is noted that the computing gate are not normally displayed on the TV monitor screen.

Referring now to the computing section 16, current $I_1$ is gated by the normalized target video pulses in a gate 86 and then applied to a horizontal error detector 88. The output signal of the horizontal error detector which is representative of the horizontal position of the centroid of the target image, the voltage $\rho_h$, is sampled and stored by a sample and hold circuit 90. The sample and hold circuit may be controlled by the vertical synchronization pulse applied from the camera 18 so that the position voltage is updated at the end of each television frame time. As will be explained in greater detail hereinafter with respect to FIG. 2, the horizontal computing gate is also applied to the horizontal error detector.

Similarly, current $I_1$ is gated in response to the normalized target video signals in a gate 89 and the output therefrom is applied to a vertical error detector 92. The detector 92 is shown in greater detail in FIG. 3 and as shown there the vertical computing gate provided by generator 82 as well as the horizontal computing gate from AND gate 84 are applied to the vertical error detector. The output signal of the vertical error detector 92 is indicative of the vertical position of the centroid target image and it is sampled and stored by circuit 94 in the manner of similar to that described for circuit 90 hereinabove.

As mentioned previously, for centroid tracking the horizontal and vertical error detector channels must form the term $\int\int S(t)dt$-K $\int S(t)dt$ — where $S(t)$ is the output signals from gates 86 and 89. The analytical basis of this centroid equation is presented in copending application Ser. No. 596,142 filed Nov. 22, 1966.

One of the more significant differences between the subject invention and that of the above cited application is that the computing signals [$S(t)dt$] are formed in accordance with the principle of the subject invention by gating current $I_1$ by the normalized target video signals at the input gate to each of the error detector channels such that the signals are normalized as a function of the target area. Additionally, the duration of the integral of the computing signal [ ∫ S(t)dt ] is not controlled by the video gate duration (V–G) but by the fixed time duration centroid computing gates which are generally much larger than the adaptive processing gates and which represent the maximum limit of the variable sized processing gates — see the dashed line 42 in FIG. 4. These just described differences are important in that they allow an adaptive gated centroid computation which is stable — i.e. the overall loop gain is maintained approximately constant as the target image size varies, and yet the target signal is adaptive gated to improve the tracker's performance under low signal conditions. Due to the adaptive gating the portion of the video signal from camera 18 not immediately associated (timewise) withe the image (not within the adaptive gates, V–G) does not degrade tracking performance. Additionally, in accordance with the subject invention the mechanization of the centroid computation is simplified and the double and single integral of the computing signals are generated by relatively simple energy storage and gating circuits at the input to the final integrator of each of the error detector channels.

The centroid computation techniques of the subject invention may be better understood after a detailed discussion of the mechanization of the horizontal and vertical error detector channels shown in FIGS. 2 and 3 respectively. Referring first to FIG. 2, the computing signal S(t)dt is applied from gate 86 (FIG. 1) through diodes 96 and 98 to a junction point 100. A capacitor 102 is connected between junction point 100 and a junction 104; and a capacitor 106 is connected between junction 104 and a reference potential plane (ground). Gate 108 which is controlled by the horizontal computing gate (HCG) is coupled in parallel with capacitor 106. Junction 100 is also coupled to the signal input circuit of a gate 110, which gate is controlled by the horizontal computing gate signal, and the output therefrom is applied to a junction point 112. A gate circuit 114, controlled by signal which is the complement of the horizontal computing signal ($\overline{HCG}$) is coupled between a junction point 112 and a resistor 116. Junction point 112 is also connected to a negative (polarity inverting) input terminal of a final integrator 118. Integrator 118 comprises a differential amplifier 120 with a capacitor 122 coupled between its output circuit 124 and a junction point 112. The output signal at circuit 124 ($\rho_h$) is representative of the horizontal position of the centroid of the target image.

Gates 108 and 110 which are controlled by the horizontal computing gate (HCG) are enabled by the absence of this gating signal and are "open" during the time period of the HCG gate. Hence, during the computing gating period, the computing signal (current $I_t$ gated by the normalized target video signals in input gate 86) is integrated by capacitors 102 and 106 such that the signal ∫S(t)dt is formed on both of these capacitors. The output signal of capacitor 106, at junction point 104 is applied to a noninverting input circuit 126 of amplifier 120 wherein this signal is again integrated to form the double integral [ ∫∫$_H$ S(t)dt ].

At the end of the horizontal computing gate period, capacitor 106 is discharged by the gate 108 and the input 126 to amplifier 120 is thereby coupled to ground. The charge on capacitor 102 is coupled through gate 110 to the inverting input 112 of amplifier 120, and resistor 116 is disconnected from junction point 112 by gate 114. Capacitors 122 and 102 are of equal value such as .01 microfarads, capacitor 106 is considerably smaller such as 1500 picofarads, for example.

The just described configuration of gates 108, 110 and 114 during the nonhorizontal computing gate time period results in amplifier 120 applying the required current through capacitor 122, to cause the potentials applied to the two input circuits of the amplifier 120 to be equal. Since noninverting input circuit 126 is held at ground potential by gate 108 during the time period and horizontal computing gate is not applied, for the above described condition to be fulfilled capacitor 102 must be discharged by current applied through capacitor 122. For the case where capacitors 122 and 102 are of equal value, the effect of discharging capacitor 102 is to subtract the charge stored thereon from the charge on capacitor 112. Hence, during one horizontal scan time of camera 18 (FIG. 1), the signal [ ∫∫$_H$S(t)dt ] is added to the previously stored $\rho_h$ value at the output of amplifier 120, during the horizontal computing gate time period; and during the period following the horizontal computing gate the signal ∫$_H$S(t)dt is subtracted from this value. Since Δ$\rho_h$ is equal to [ ∫∫$_H$S(t)dt ] minus ∫$_H$S(t)dt, the value of $\rho_h$ at the output of the integrator 118 is updated during each horizontal scan period.

The vertical error detector 92 is shown in greater detail in FIG. 3. Referring now primarily to FIG. 3, the signal S(t) is applied through diodes 130 and 132 to a junction point 134 at the input to a gating circuit 146. A gate 136 is coupled between capacitors 138 and 140, and a gating circuit 142 is connected between the input to the gate 136 and ground. A gate 144 is coupled across capacitor 140. Gates 146, 148 and resistor 150 are coupled in identical arrangement to the corresponding items of FIG. 2 described hereinabove. An operational amplifier 152 and a capacitor 154 are connected to form an integrator 156 in a similar manner to that described above for integrator 118. Gates 142 and 146 are controlled by the horizontal computing signal; gates 136 and 148 by the $\overline{HCG}$ signal; and gate 144 is controlled by the vertical computing signal (VCG) applied from gate generator 82 (FIG. 1). As described in FIG. 2, in FIG. 3 the gating mechanization is such that each gate is enabled by the absence of the designated gating signal. For example, gate 142 is enabled (closed) during the "nonhorizontal" computing gate time period; gate 136 is enabled during the horizontal computer gate time period; and gate 144 is closed during the frame time other than the vertical computing gate time period.

In the operation of the vertical error detector, the S(t) current applied to diodes 130 and 132 is integrated during the horizontal computing gate time on the capacitor 138 and on the capacitor 140. The signal on capacitor 140 is applied during the horizontal computing gate time period to the input circuit 158 of differential operational amplifier 152, therefore forming the signal ∫∫$_V$S(t)dt on capacitor 154. Capacitor 154 may be the same value as capacitor 138, and therefore as explained previously relative to FIG. 2 the charge on capacitor 138 is transferred to capacitor 154 during the nonhorizontal computing gate time period. It should be noted that in the vertical error detector of FIG. 3, the capacitor 140 is shunted by gating circuit 144 except during the vertical computing gate time period. Hence, the signal Δ$\rho_v$ which is equal to the ∫∫$_V$S(t)dt- $\int _vS(t)dt$ is formed for the vertical tracking dimension during each frame time of camera 18, and the signal $\rho_v$ at the output of amplifier 152 is continuously updated to represent the vertical position of the centroid target image.

It will be noted from the discussion hereinabove relative to the centroid mechanization that the error detectors in accordance with the subject invention not only compare the energy on alternate sides of the center of the computing gates but in addition weights (modifies the relative value of) this energy as a function of relative distance from the gate center. It has been found that this procedure produces error characteristics which result in a tracker of greater accuracy and stability than prior systems. For a given target video waveform, error characteristics are plotted in FIGS. 7 and 8 showing the shift in gate position per sample, $\Delta\rho$, as a function of gate error $\epsilon_g$. Reference is now directed to FIGS. 7 and 8 wherein for comparison purposes FIG. 7 shows error characteristics of a conventional gradient type system, and FIG. 8 shows the error characteristics for a centroid tracking system. Both FIGS. 7 and 8 are representative of the variation of the error characteristics with decreasing range as the target profile (shown as dashed lines) grows.

It may be seen that compared to the irregular shape and double nulls of the gradient system of FIG. 7, the centroid system offers well behaved error characteristic shape which is very important for tracker stability. If the error curve has multiple null points as exhibited by the curves of FIG. 7, the tracker gates may oscillate from null to null, therefore reducing accuracy and stability. Also, some of the prior art constant gradient signal processors tend to track a target edge, while the system in accordance with the subject invention will track the target centroid as long as the target image is not larger than the maximum processing gate size (equal to the computing gate size shown in FIG. 4 as dashed lines 84). If the target size is larger than the maximum processing gate size, the tracker of the subject invention will tend to drift towards the target image edge but its aim point will always be within the target outline by at least one-half of the gate dimension.

During an acquisition mode of operation, voltages H(ACQ) and V(ACQ) are applied to networks 160 and 162 of FIGS. 2 and 3, respectively. These acquisition voltages may be provided by any one of a number of suitable conventional hand control units (not shown). Circuit 160 is so coupled to the integrator 118 as to cause the horizontal centroid voltage $(\rho_h)$ to be controlled in response to the input signal H(ACQ). Similarly, network 162 is so coupled to integrator 156 of FIG. 3, as to cause the voltage $(\rho_v)$ to be controlled by the input signal V(ACQ).

To summarize the operation of the tracker of FIG. 1, the video signals representative of the scene within the field of TV camera 18 are applied in a line-by-line format to the signal processing section 12. Contrast selection switch 46 allows for the selection of either black or white target images relative to the background contrast. The gain of video amplifier 44 is determined by the output signal from peak detector 50. The output signal from amplifier 44 is applied to video gate 48 wherein it is gated by adaptive processing gate V–G. Gates V–G are provided by the combination of the variable size horizontal processing gate and the variable size vertical processing gate in an AND gate 78. A typical series of these horizontal gates is shown in a waveform 158 of FIG. 6 and a typical vertical gate is shown in a waveform 160 of FIG. 7. The width of the illustrated gates was arbitrarily selected and it is understood that the width (time duration) of these gating signals varies as a function of the target image area. The portion of video signal which is coincident in time with the V–G gates is applied to the comparator 52. A rudimentary sketch of this portion of the signal is depicted in waveforms 162 and 164 of FIG. 6 for the two different positions of contrast selection switch 46. Assuming that the contrast switch has been positioned such that the waveform 162 is applied to the comparator 52, the output of the comparator is a signal which has a fixed amplitude and its time duration is a function of the target image duration during each horizontal scan as is shown by the waveform 166 in FIG. 6.

The comparator 52 distinguishes signals as target or "not-target" based on a fixed threshold level $(V_{R1})$. The output normalized target video signals from the comparator 52 are digital in amplitude but analog in time duration and the integral of these signals is indicative of target image area. The normalized target video signals are processed in feedback loop 54 to form the current $I_1$ (the output of divider 62) which current is an inverse function of the target image area.

The current $I_1$ is processed in gates 64 and 66, subtractor 68, and integrator 70 to form the signal $V_{gs}$ which signal is approximately a function of the square root of the target image area and is used to control the size of the variable size processing gates produced by gate generators 74 and 76.

The current $I_1$ is also gated by the normalized target video signals in gating units 86 and 89 to form the $S(t)$ signals which are processed by the horizontal and vertical error detectors, as explained hereinabove relative to FIGS. 2 and 3, to form the signal $\rho_h$ and $\rho_v$ indicative of the horizontal and vertical position, respectively, of the centroid of the target image.

Figure 9:
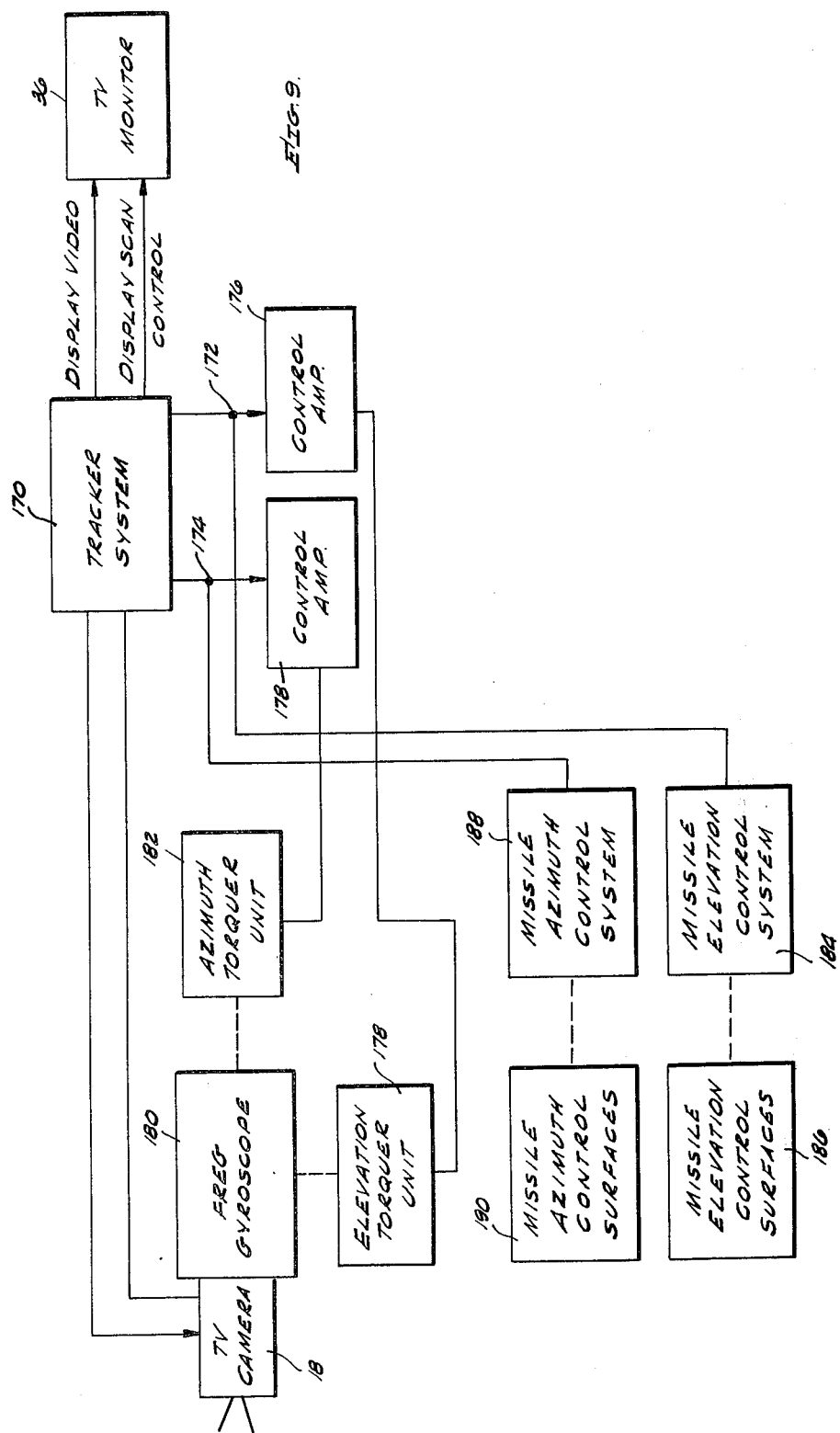
FIG. 9 is a block diagram showing a guidance system application wherein the subject invention may be utilized.

The tracking system in accordance with the principles of the invention may be utilized in such applications as target detection and armament control, or missile guidance in air-to-air, ground-to-air or ground-to-ground missiles. For example, the system of FIG. 9 shows a homing missile terminal guidance system incorporating the principles of the invention. The operator selects the objects to be tracked by utilizing a hand control device (not shown) to control the voltages H(ACQ) and V(ACQ) applied to the detectors of FIGS. 2 and 3 respectively, so that the variable size tracking gates 42 encompass the image 40 to be tracked. It is noted that the horizontal and vertical gate generator 74 and 76 shown in FIG. 1 are controlled by the signal $V_{gs}$, however, these generators have a minimum size to which the tracking gates will contract when extremely small target is being tracked or during the acquisition period prior to the tracker stabilizing on a selected target image.

The tracking system of FIG. 1, exclusive of TV camera 18 and TV monitor 36, is designated 170 in FIG. 9. In response to the video signals applied from TV camera 18, tracker unit 170 provides output voltages $\rho_v$ and $\rho_h$ at terminals 172 and 174 which represent the approximate vertical and horizontal centroid position, respectively, of the target image relative to the TV camera's field of view. These signals $\rho_v$ and $\rho_h$ may be utilized, for example, by any suitable conventional missile terminal guidance system to direct the flight path of the missile after launch. For example, as shown in FIG. 9, the elevation tracker reference potential $p_v$ at the terminal 172 is processed by a conventional electronics servomechanism control amplifier 176 and then coupled to a conventional gyroscope torque unit 178. The gyroscope unit 180 is mechanically precessed by the action of the torque unit 178. The gyroscope device 180 may be of any suitable conventional type such as that shown in FIG. 10–5(a) on page 272 of the text entitled, *Guided Missile Engineering*, published by McGraw-Hill Book Company, New York. The force exerted by the torque unit 178 is such as to process the gyroscope in the elevation angular direction thereby changing the field of view of the TV camera 18, which is physically attached to the gyroscope unit 180. The resulting angular motion of the TV camera tends to point the optical axis more towards the vertical position of the designated target, therefore resulting in a decrease of elevation tracker reference potential at the terminal 172.

In a similar manner, the azimuth tracker potential $p_h$ applied at terminal 174 is processed by a conventional electronic servomechanism control amplifier 178 and is then coupled to a conventional gyroscope torque unit 182. The force exerted by the torque unit 182 is such as to precess the gyroscope 180 in the azimuth angular direction and thereby change the field of view of the TV camera 18. The resultant angular motion of the TV camera 18 is to point the optical axis more towards the horizontal position of designated object resulting in a decrease in the aximuth tracker reference potential at the terminal 174.

Also, the elevation tracker reference potential at the terminal 172, $p_v$, is coupled to a suitable conventional missile elevation control system 184. In response to the signal $p_v$ the system 814 mechanically drives missile elevation control surfaces 186. This outer servocontrol loop, which is closed by control surfaces 186, tends to null the line of sight angle to the designated object with respect to the missile velocity vector.

In a similar manner, the tracker azimuth reference potential at the terminal 174 is coupled to a suitable missile azimuth control system 188 which drives the missile azimuth control surfaces 190 and thereby closes the outer servoloop in the horizontal direction.

It is noted that the frequency response of the servoloop comprising the camera 18 and tracker system 170 is usually higher than that of the control loop for positioning the camera 18 and gyroscope 180 combination, and that the servoloop controlling the missile steering surfaces conventionally possesses the longest time response.

Thus there has been described an adaptive centroid tracker mechanization which provides enhanced system effectiveness for both blooming and low signal-to-noise ratio target applications. Although a single selected preferred embodiment has been described herein with particularity, it is understood that many changes or modifications thereto may be made without departing from the scope of the subject invention.

What is claimed is:

1. A system for determining the relative angular position of an object, said system comprising:
   transducer means for sequentially producing first signals representative of the relative intensity of increments of area of the received image of said object and a surrounding scene;
   means for adaptive gating said first signals as a function of the image area, to form second signals;
   means for processing said second signals to form third signals the time duration of which is representative of the time duration of associated increments of area of said image and the amplitude of which is an inverse function of the image area; and
   error detector means for processing said third signals to provide output signals representative of the relative angular position of the centroid of said image.

2. The system of claim 1 wherein said error detector means includes computing means for forming the integral and the double integral of said third signals and for subtracting one of said integral signals from the other.

3. The system of claim 2 wherein said system further includes computing gate generator means for generating fixed time duration computing gates whose relative time position is controlled by said output signals; and said computing means includes first integrator means for forming the integral of said third signals; second integrator means for forming the integral of said third signal; an output integrator-subtractor circuit; and gating means for coupling said first and second integrator means to said output integrator-subtractor circuit such that said integrator-subtractor circuit forms, the double integral minus the integral of said third signals.

4. The system of claim 3 wherein said integrator-subtractor circuit includes a differential amplifier, and a first capacitor coupled between the output and one input of said differential amplifier; and said first and second integrators include second and third capacitors, respectively, series coupled to said means for forming said third signals; said second capacitor being coupled to the other input of said differential amplifier, whereby the double integral of said third signal is formed during said computing gate periods; and said gating means includes a first gating circuit for shunting said second capacitor during the time periods other than during the computing gate time periods, a second gating circuit for coupling said third capacitor to said one input of said differential amplifier during said other time periods, a resistor, and a third gating circuit for coupling said resistor to said one input of said differential amplifier during said other time periods, whereby the integral of the third signal is subtracted from the value stored on said first capacitor.

5. The system of claim 4 wherein the relative values of said first, second and third capacitors and said resistor provide the proper scale factor such that said double integral minus the integral is representative of the position of the centroid.

6. The system of claim 1 wherein said means for adaptive gating includes processor gate generators for providing processing gates the relative time position of which are controlled by said output signals and whose time duration is varied as a function of the image area.

7. The system of claim 6 wherein said means for adaptive gating includes means for processing said third signals to form a gate width control signal which approximates the square root of the image area, and means for controlling said processor gate generator such that the time duration of said processing gates is controlled by said gate width control signal.

8. The system of claim 1 wherein said error detector means includes a horizontal error detector channel for providing a first output signal representative of the position of the horizontal centroid of said image; a vertical error detector channel for providing a second output signal representative of the position of the vertical centroid of said image; and computing gate generator means for generating fixed time duration horizontal and vertical computing gates whose relative time positions are controlled by said first and second output signals, respectively.

9. The system of claim 8 wherein said means for adaptive gating includes horizontal and vertical processor gate generators for providing horizontal and vertical processing gates whose relative time position is controlled by said first and second output signals, respectively, and whose time duration is varied as a function of the image area.

10. The system of claim 9 wherein said means for adaptive gating includes means for processing said third signals to form a gate width control signal which approximates the square root of the image area, and means for controlling said processor gate generators such that the time duration of said processing gates is controlled by said gate width control signal.

11. The system of claim 8 wherein said horizontal error detector channel includes first and second integrators, means for applying said third signals to said first and second integrators; an output integrator-substractor circuit; and gating means for coupling said first and second integrators to said output integrator-subtractor circuit such that said integrator-subtractor circuit forms, the double integral minus the integral of said third signal relative to the horizontal dimension.

12. The system of claim 11 wherein said integrator-subtractor circuit includes a differential amplifier, and a capacitor coupled between the output and one input of said differential amplifier; said first integrator being coupled to the other input of said differential amplifier; and said gating means including a first gating circuit for shunting said first integrator during time periods other than during the time of coincidence of said horizontal and vertical gates, a second gating circuit for coupling said second integrator to said one input of said differential amplifier during said other time periods, a resistor, and a third gating circuit for coupling said resistor to said one input of said differential amplifier during said other time periods.

13. The system of claim 8 wherein said vertical error detector channel includes first and second integrators, means for applying said third signals to said first and second integrators: an output integrator-subtractor circuit; and gating means for coupling said first and second integrators to said output integrator-subtractor circuit such that said integrator-subtractor circuit forms the double integral minus the integral of said third signal relative to the vertical dimension.

14. The system of claim 13 wherein said integrator-subtractor circuit includes a differential amplifier, and a capacitor coupled between the output and one input of said differential amplifier; said first integrator is coupled to the other input of said differential amplifier; and said gating means includes a first gating circuit for shunting said first integrator during time periods other than during the vertical computing gate time period, a second gating circuit for coupling said second integrator to said one input of said differential amplifier during time periods other than the time of coincidence between said horizontal and vertical gates, a resistor, a third gating circuit for coupling said resistor to said one input of said differential amplifier during said time periods other than the time of coincidence between said horizontal and vertical gates.

* * * * *